3,480,444
COLD WATER SOLUBLE ACID COMPOSITION
William A. Mitchell, Lincoln Park, N.J., and William C. Seidel, Monsey, N.Y., assignors to General Foods Corporation, White Plains, N.Y., a corporation of Delaware
No Drawing. Continuation-in-part of application Ser. No. 360,062, Apr. 15, 1964. This application Oct. 19, 1967, Ser. No. 676,640
Int. Cl. A23l 1/00
U.S. Cl. 99—78      9 Claims

ABSTRACT OF THE DISCLOSURE

A cold water soluble adipic acid or fumaric acid composition is prepared by heating dextrose sufficiently to form a melt, uniformly dispersing the acid into the melt and cooling the melt to effect crystallization of the mixture. Crystallization may be promoted by seeding the acid-dextrose melt with a sugar. The resulting mixture can then be comminuted to produce a powdered composition which dissolves rapidly in cold water.

---

This application is a continuation-in-part of copending application Ser. No. 360,062, filed Apr. 15, 1964, and now abandoned.

Citric acid has been employed as an acidulant in dry beverage mixes capable of being dissolved in cold water. In addition to citric acid, such mixes usually contain other hygroscopic materials, such as sugar. These compositions are relatively unstable when stored for extended periods of time since they readily absorb moisture and cake upon standing. Storage problems encountered with such dry beverage mixes have always been of great concern, particularly in climates which are warm and humid. Adipic acid and fumaric acid have many properties which make them desirable for commercial use in such products. However, such uses are limited since both these acids have a very low rate of solubility in cold water. While the dry beverage mixes of commerce must dissolve in cold water having a temperature of about 35°–45° F. in one minute or less, the use of adipic or fumaric acid in such mixes has been impossible due to the fact that these acids do not dissolve rapidly in such water, periods as long as several hours at times being insufficient to put all of the acid into solution.

Since dextrose is stable to moisture absorption upon long storage, it was suggested to dry blend fumaric or adipic acid with dextrose to improve the solubility rate of the acid. However, this method was not successful. It was also attempted to form a heated mixture of acid and dextrose which when cooled to a hard mass was ground to a suitable particle size. This material while having an improved rate of solubility initially was found to have a tendency to absorb moisture during storage thereby rendering the product useless upon reconstitution due to clumping and loss of solubility rate.

It would, therefore, be desirable to prepare either an adipic acid or fumaric acid composition having an increased rate of solubility in cold water which is also stable to moisture absorption during storage at high temperatures and humidities.

Another object of this invention is to prepare an acid composition which when used in cold-water soluble beverage mixes will prevent the occurrence of chemical reactions during storage which degrade the beverage flavor and color.

Further objects of this invention will be apparent from a reading of the specification.

It has now been discovered that adipic acid and fumaric acid of increased solubility rate in cold-water may be produced by a method which comprises heating dextrose to between 280° to 370° F. to form a continuous phase of melted dextrose; dispersing the acid uniformly throughout the dextrose melt, said acid having a particle size of less than 200 U.S. standard mesh; cooling the dextrose melt to effect crystallization; and subdividing said crystallized dextrose-acid mixture to a particle size of between 40 and 140 U.S. standard mesh, said particles being stable to moisture absorption when stored at high temperatures and humidities.

According to a preferred method of practicing the invention the crystalization of the acid-dextrose melt is promoted by seeding the melt with a sugar. This can be done by cooling the acid-dextrose melt to between 150–250° F. and dispersing the sugar into the melt. The "seed" sugar is preferably dextrose or lactose.

As used in the present invention the term "acid" refers to an acid selected from the group consisting of adipic and fumaric acids. The term "dextrose" means relatively pure anydrous dextrose or dextrose hydrate as well as high dextrose containing solids having a dextrose content of above 50% and preferably about 90 to 99% dextrose.

In producing the acid compositions according to this invention, the acid is first ground to effect a size reduction, typically a particle size of less than 200 U.S. standard mesh is necessary and preferably a particle size smaller than 400 U.S. standard mesh is desirable. The subdivided acid is then dispersed into the melted dextrose to achieve a uniform distribution of small acid particles throughout the melted dextrose.

The acid-dextrose melt is then cooled, preferably to below 230° F., and most preferably to between 200° to 210° F. before incorporating powdered lactose or dextrose throughout the melt to initiate crystallization of the dextrose. Enough dextrose or lactose should be added to achieve a level of between 10 and 40% acid by weight of th total product. Usually about 10 to 15% by weight of "seed" is added to crystallize the dextrose in proper form. However, any amount of seed may be added as along as the final acid content is between 10 to 40%. As the dextrose forms into crystals, the fine particles of acid will be forced between the surfaces of the crystals as they form. During crystallization some dextrose, due to impurities being present in the melt, will not crystallize and will remain in an amorphous state. A small percentage of amorphous sugar is desirable as long as this is kept to below 20% and preferably about 3–10% by weight of the total composition.

After crystallization of the dextrose the hardened mass is subdivided or ground to a particle size suitable for quick-solubility in cold water. This size will be between 40 and 140 U.S. standard mesh and preferably 40–100 mesh. Particles greater than 40 mesh will not dissolve in less than 3 minutes and particles smaller than 140 mesh will not retain the acid particles in an embedded state and will tend to clump and float upon rehydration.

The acid composition of this invention while extremely stable during storage may tend to pack or cake when subjected to pressure during the packaging operation. For example, when the composition is blended with flavor and color and placed in paper pouches which are passed through rollers or similar pressure equipment in order to distribute the powdered material uniformly throughout the package and provide a relatively flat package it has been found that the particles tend to pack or stick together. This may be prevented by incorporating in the granulated product 0.3 to 1.5% powdered calcium or magnesium carbonate, based on the weight of the fumaric or adipic acid. The powdered carbonate may be blended with the crystallized acid-dextrose composition after grinding. In this manner, a free-flowing powder which is resistant to packing or caking during the packaging operation is assured.

This invention will now be described more specifically by reference to the following specific examples.

Example I

Powdered dextrose (95% purity) was dissolved in warm water (80° F.) until a 70% concentration of dextrose was achieved. The dextrose solution was further concentrated in a low-temperature scraped-surface vacuum evaporator (Rodney-Hunt) at a pressure of 20″ mercury vacuum and a heating jacket temperature of 340° F. The jackets were heated by steam at 100 p.s.i.g. The dextrose solution entered the evaporator at room temperature and was removed at a temperature of about 300° F. as a free-flowing liquid. Residence time in the evaporator was about 1 minute and the liquid was concentrated to about 98% dextrose solids.

Fumaric acid, finely divided to a mesh size of less than 400 U.S. standard mesh (37 microns), was then dispersed uniformly into the dextrose melt at a level of about 3 parts dextrose to 1 part fumaric acid. Uniform dispersion was accomplished by means of a colloid mill having a clearance of between 0.005″ to 0.060″. The liquid solution entered the colloid mill at a temperature of about 260° F. and was extruded at a temperature of 270° F. Residence time in the colloid mill was about 30 seconds.

The product issuing from the colloid mill was then crystallized by dispersing powdered dextrose as "seed" material into the fumaric acid-dextrose melt. The melt was first cooled to about 200° F., before adding the powdered dextrose in order to prevent melting of the "seed." Enough dextrose was dispersed throughout the melt to achieve a concentration of about 18% fumaric acid by weight in the final product. The product hardened to a crystallized mass in less than 1 minute. The crystallized mass was then ground in a Fitzpatrick mill to a mesh size of less than 40 U.S. standard mesh and above 100 U.S. standard mesh.

Untreated fumaric acid having a particle size of less than 400 U.S. standard mesh had a solubility rate of 3.2 grams per two quarts of water in 15 to 20 minutes when dissolved in water at 45° F. whereas the fumaric acid composition produced in accordance with this invention had a solubility rate of 3.2 grams per two quarts of water in less than 1 minute at the same temperature.

Storage of this composition at 90° F. and 85% relative humidity for a period of 6 months revealed no caking or degradation of the product. The product upon reconstitution had the same taste, solubility rate, and clean appearance of the freshly prepared sample.

Example II

The procedure of Example I was followed with the exception that fumaric acid was blended into the hot melt of dextrose at a ratio of 2 parts by weight dextrose to 1 part by weight of fumaric acid. The melt was then cooled to about 230° F. and enough powdered dextrose was added to bring the acid level to about 18%. The product was then ground to a suitable particle size and found to have the same properties as the Example I product.

Example III

The procedure of Example I was followed with the exception that lactose was used in place of dextrose to "seed" the acid-dextrose melt. This product had the same properties as the Example I product.

The acid composition of the present invention may be employed wherever it is desired to utilize adipic or fumaric acid in cold water where a relatively rapid rate of solubility is required. One such use is in fruit flavored beverage mixes which are dissolved in very cold water. Such mixes typically contain sugars, an edible acid, flavoring and coloring. A typical fruit flavored beverage mix composition as employed in this invention contains the above acid-dextrose composition, 0.25 to 1.75 percent by weight fruit flavor and 0.10 to 1.25 percent color. About 17.7 grams of the above mix are dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage mixes which contain the fumaric acid composition of the present invention in combination with a sugar such as sucrose or the like exhibit little or no caking after extended periods of storage, and after such time, can be dissolved in cold water within several minutes. When the fumaric acid composition of the present invention is employed in fruit flavored beverage mixes which contain sucrose, flavoring, coloring and the fumaric acid composition as a substitute for citric acid, it is possible to reduce the total weight of acid about 25–35% while obtaining a beverage equally acceptable in taste.

While this invention has been described in the specification by several examples, reference should be had to the appended claims for a definition of its scope.

What is claimed is:

1. A process for improving the cold-water solubility rate of an acid selected from the group consisting of adipic and fumaric acid which comprises heating dextrose to betwen 280°–370° F. to form a continuous phase of melted dextrose; dispersing said acid uniformly throughout the dextrose melt, said acid having a particle size of less than 200 U.S. standard mesh; cooling the dextrose melt to effect crystallization; and subdividing said crystallized dextrose-acid composition to a particle size of between 40 and 140 U.S. standard mesh.

2. A process according to claim 1 wherein crystallization is promoted by dispersing a sugar selected from the group consisting of dextrose and lactose in the melt during the cooling step.

3. A process according to claim 2 wherein the dextrose melt is cooled to 150–250° F. prior to dispersing said sugar therein.

4. The process of claim 2 wherein the level of acid present in the crystallized dextrose is between 10 and 40% by weight of the total composition and said acid has a particle size of less than 400 mesh.

5. The process of claim 4 wherein the dextrose melt contains amorphous sugar at a level of less than 20% by weight of the total composition.

6. The process of claim 5 wherein the level of acid present in the crystallized dextrose is about 30% by weight of the total composition.

7. The process of claim 6 wherein powdered carbonate taken from the group consisting of calcium carbonate and magnesium carbonate is added to the crystallized dextrose-acid composition to prevent caking of said composition under pressure.

8. A process for improving the cold-water solubility rate of an acid selected from the group consisting of adipic and fumaric acid which comprises heating dextrose to between 280°–370° F. to form a continuous phase of melted dextrose; dispersing 10–40% by weight of said acid uniformly throughout said dextrose melt, said acid having a particle size of less than 400 U.S. standard mesh; cooling said dextrose melt to 150–250° F.; disrupting said continuous phase of melted dextrose by dispersing a sugar in said melt to thereby crystallize the dextrose and embed acid particles between the crystals of dextrose, said sugar being taken from the group consisting of dextrose and lactose; and subdividing said crystallized dextrose-acid composition to a particle size of between 40 and 100 U.S. standard mesh, said particles being stable to moisture absorption.

9. The process of claim 8 wherein the dextrose melt contains 3–10% by weight of an amorphous sugar.

(References on following page)

References Cited

UNITED STATES PATENTS

| | | | |
|---|---|---|---|
| 3,016,299 | 1/1962 | Raffensperger et al. | 99—78 |
| 3,016,300 | 1/1962 | Raffensperger et al. | 99—78 |
| 3,181,954 | 5/1965 | Inoue et al. | 99—78 |

A. LOUIS MONACELL, Primary Examiner
STEPHEN B. DAVIS, Assistant Examiner

U.S. Cl. X.R.

99—140, 141